United States Patent [19]

Hulsing, II

[11] Patent Number: 5,270,594
[45] Date of Patent: Dec. 14, 1993

[54] COMPACT BIDIRECTIONAL TORQUE MOTOR WITH INCREASED TORQUE

[75] Inventor: Rand H. Hulsing, II, Redmond, Wash.

[73] Assignee: Sundstrand Corporation, Rockford, Ill.

[21] Appl. No.: 720,889

[22] Filed: Jun. 25, 1991

[51] Int. Cl.[5] ............................................. H02K 33/12
[52] U.S. Cl. ......................................... 310/17; 310/15; 73/505
[58] Field of Search ..................... 310/15, 17; 335/276, 335/279, 281, 296, 297; 73/505, 510

[56] References Cited

U.S. PATENT DOCUMENTS

| 3,312,842 | 4/1967 | Heuchling et al. | 310/17 |
| 3,671,787 | 6/1972 | Herron | 310/154 |
| 3,828,213 | 8/1974 | Yamashita et al. | 310/254 |
| 4,642,539 | 2/1987 | Hinds | 318/439 |
| 4,855,700 | 8/1989 | Mohler | 335/229 |
| 4,968,909 | 11/1990 | Hulsing | 310/17 |

FOREIGN PATENT DOCUMENTS 0917094 3/1982 U.S.S.R. .

Primary Examiner—Steven L. Stephan
Assistant Examiner—Judson H. Jones
Attorney, Agent, or Firm—Fitch, Even, Tabin & Flannery

[57] ABSTRACT

A compact torque motor provides increased bidirectional, limited angle, reactionless torque to opposed structures. A torque motor (50) includes an X-shaped core (52), and first and second pole pieces (54) and (56), which are disposed at opposite sides of the core. Two opposite legs on the X-shaped core comprise a first core section (58), which is transverse to a similar second core section (60). A first electromagnetic coil (62) is formed on the first core section and a second electromagnetic coil (64) is formed on the second core section. The ends of the first core section thus become magnetic poles (66) and (68) when an electrical current flows through the first electromagnetic coil; and similarly, the ends of the second core section become magnetic poles (70) and (72) when an electrical current flows through the second electromagnetic coil. The sides of the magnetic poles are generally radially aligned about a central axis (88). Adjacent the sides are disposed tabs (78, 80, 84, and 86) that are connected to the first and second pole pieces. These tabs are also generally radially aligned, and in cooperation with the adjacent sides of the magnetic poles, define gaps (100) through which magnetic flux flows. Magnetic flux developed by the first and second electromagnetic coils is conveyed through the first and second pole pieces and produces a force in a direction tangential to radial lines through the gaps. A radial fringe force caused by a fringe field at the end notches (106) in the sides of the magnetic poles is compensated by forming the tabs and the pole faces at a very small angle in respect to radial lines through the central axis. The compensating force developed as a result of the small angular offset is equal in magnitude, but opposite in direction to the radial fringe force so that the torque developed is substantially free of a radial component.

21 Claims, 7 Drawing Sheets

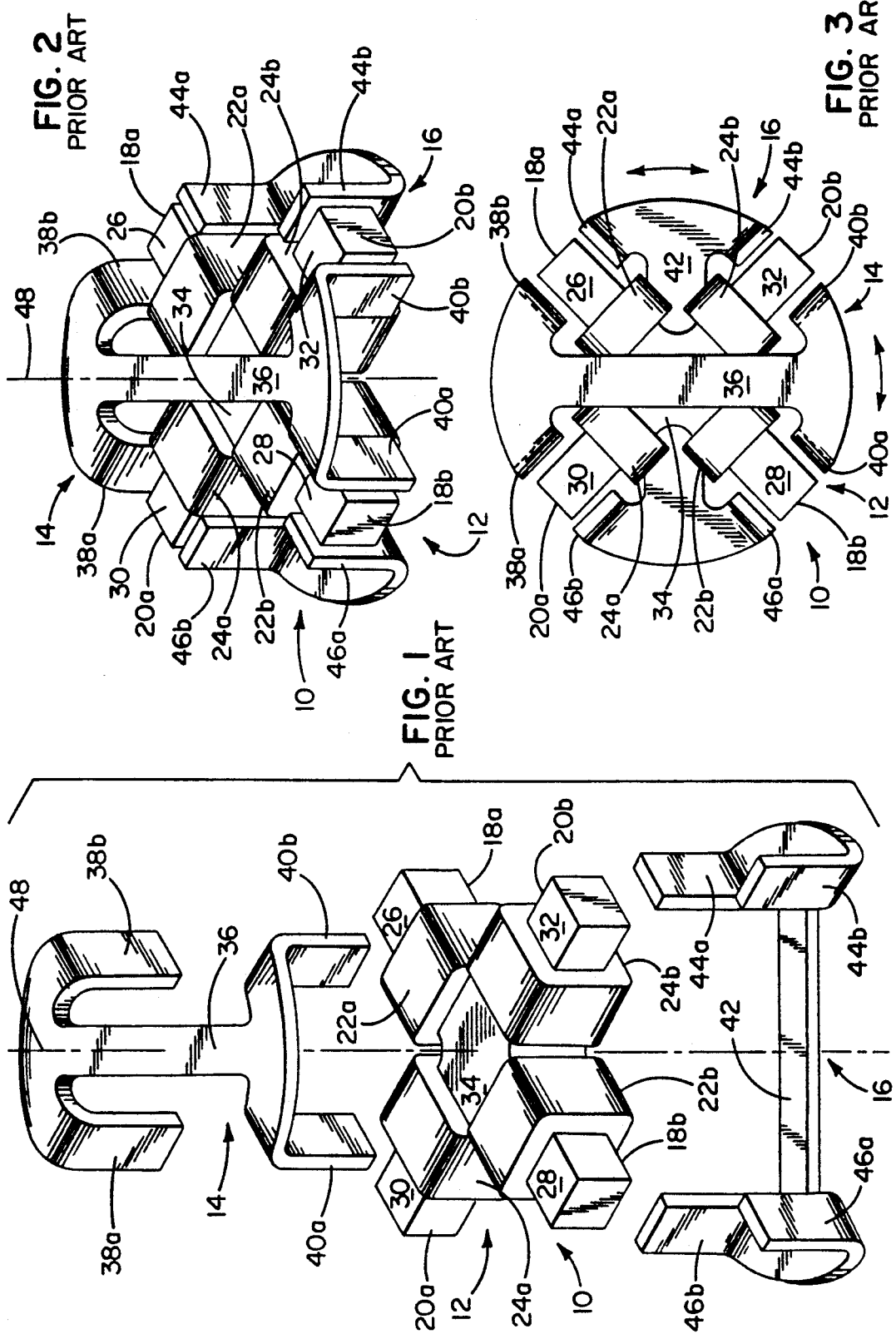

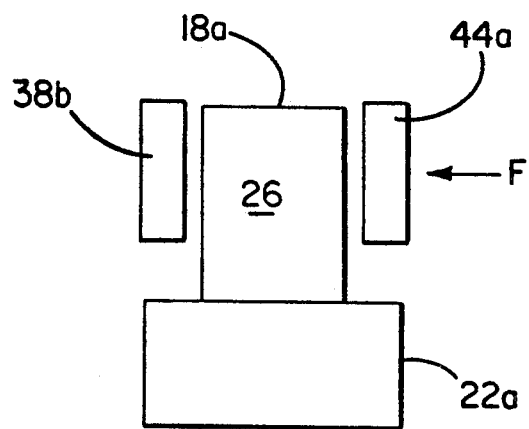
FIG. 5A
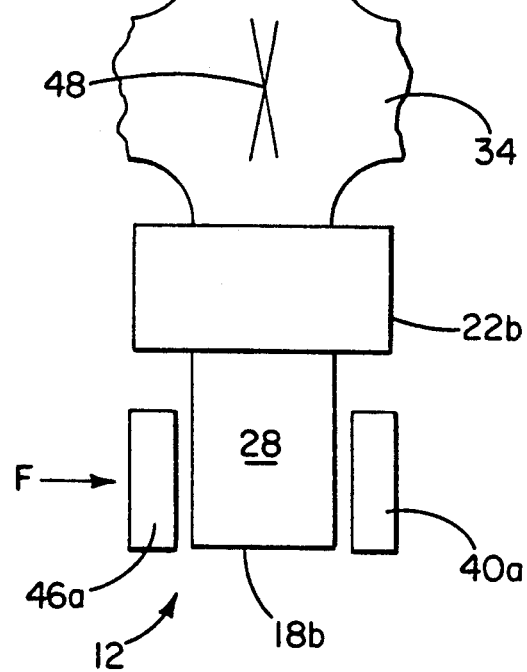
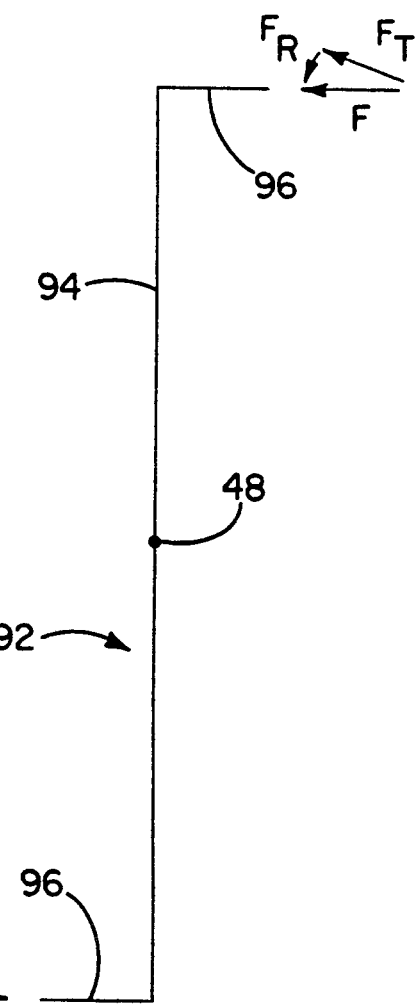
FIG. 5B

COMPACT BIDIRECTIONAL TORQUE MOTOR WITH INCREASED TORQUE

TECHNICAL FIELD

This invention generally pertains to electromagnetic motors, and particularly, to motors having a plurality of electromagnetic coils disposed on a fixed core and a rotor that is magnetically driven to rotate bidirectionally through a limited angle with respect to the core.

BACKGROUND OF THE INVENTION

A multi-axis angular rate sensor is disclosed in commonly assigned U.S. Pat. No. 4,821,572. In this device, a plurality of pairs of accelerometers are mounted on a first and a second frame member for rotation about a common axis. The first and second frame members are counterrotated about the common axis, without transmitting a reaction force to a supporting base that is interposed between the frame members.

The drive mechanism used to counterrotate the frame members, as disclosed in the above-referenced patent, comprises first and second C-shaped electromagnetic coils and associated pole pieces. Each electromagnetic coil and its associated pole piece are attached to different frame members so that when the coils are alternately and sequentially energized with an electric current, the frame members rotatably dither back and forth in opposite directions.

Several problems are associated with the drive mechanism used in the prior art multi-axis rate sensor. Although the frame members only rotate a few degrees in each direction, the first and second electromagnetic coils are energized by current supplied through leads that are continually flexed as a result of the dither motion of the device. Eventually, even the most flexible conductors available may work-harden and break. Since the coils are attached adjacent the periphery of the frame members, the mass and rotational inertia of the frame members are substantially increased by the addition of the coils, although an important design goal for this device was to minimize these parameters.

Conventional direct current (DC) electromagnetic motors capable of developing the torque required to drive the multi-axis rate sensor are comparatively bulky. Their bulk is necessary to accommodate permanent magnets, ferrous metal flux linkage members, and pole pieces that focus the magnetic flux across air gaps in the motor. A rotor in a conventional motor typically includes armature windings that are energized through brushes, which produce radio frequency (RF) noise and are subject to wear. The mass of such a rotor and its inertia prevent it from quickly stopping and reversing direction. Accordingly, a conventional prior art DC motor is not usable to drive the multi-axis rate sensor described above. Conventional motors are neither sufficiently compact nor do they include a rotor that is sufficiently low in mass and inertia to rapidly rotate back and forth through a small incremental angle. Since a conventional DC motor cannot easily be adapted to this application, it has been necessary to develop a new type of motor that meets these design criteria for driving the multi-axis rate sensor. Several embodiments of this new motor design are described in commonly assigned U.S. Pat. No. 4,968,909. The motor includes an X-shaped core and first and second pole pieces that are disposed at opposite sides of the core, i.e., above and below the core. Two opposed legs on the X-shaped core comprise a first core section, which is transverse to a similar, second core section. First and second electromagnetic coils are formed on the first and second core sections, respectively. Tabs disposed proximate the legs of the first and second pole pieces are attracted to magnetic poles created at the ends of the legs when either of the electromagnetic coils are selectively energized. Magnetic flux developed by the first and second electromagnetic coils flows through the tabs and through the first and second pole pieces, between the opposite magnetic poles. By alternately energizing the electromagnetic coils, two oppositely directed torques are sequentially developed that cause the pole pieces to counterrotate back and forth about a central axis. Since the pole pieces are lightweight, rotational inertia of the motor is very low, and its efficiency is relatively high.

Although the compact torque motor described and claimed in U.S. Pat. No. 4,968,909 solves many of the problems that preclude other motors being used to drive the multi-axis angular rate sensor, it is not an optimum solution. The configuration of the legs used in the X-shaped core was found to produce a torque having radial components. Radial components of torque are developed in this prior art configuration because the gaps defined between the generally parallel sides of the core legs and the adjacent tabs are not radially aligned in respect to the central axis of the motor. Instead, each gap is parallel with the side of one of the legs and therefore, a line through the center of the gap is offset to one side of the center of rotation or central axis of the motor. As a result, the magnetic flux through each gap develops a force that has both tangential and radial components. The radial component of force does not contribute to the desired rotation of the pole pieces and consequently represents a loss in motor efficiency. More importantly, the radial force can cause imbalance in the torque applied to the two pole pieces, producing unacceptable non-torsional stress and vibrational modes in the pole pieces that are picked up by the rotational rate sensors as noise and cause an error in the determination of rotational rate.

It is therefore an object of the present invention to minimize or compensate for any magnetic forces acting on the pole pieces in a compact motor that do not contribute to the rotational torque developed by the motor. It is a further object of the invention to provide a balanced rotational torque acting on the pole pieces of the compact motor. Yet a further object is to minimize non-torsional stress and vibrational modes that can be produced when radial forces are developed by the motor that act on the pole pieces. These and other objects and advantages of the present invention will be apparent from the attached drawings and the Description of the Preferred Embodiments that follows.

SUMMARY OF THE INVENTION

In accordance with the present invention, a torque motor having a central axis about which a rotational torque is developed comprises an electromagnetic core that includes two pairs of outwardly extending legs arranged around the central axis. A radially outer end of one leg of each pair of legs is disposed diametrically opposite a radially outer end of the other leg of the pair. Each leg has opposite sides that, adjacent the outer end of the leg, are generally radially aligned about the central axis of the torque motor. A first multi-turn coil is disposed around one pair of legs and is operative, when energized with an electrical current, to cause the radially outer ends of that pair of legs to become opposite magnetic poles. Similarly, a second multi-turn coil is disposed around the other pair of legs and when energized with an electrical current, causes the radially outer ends of the other pair of legs to become opposite magnetic poles.

A first pole piece is mounted to rotate bidirectionally about the central axis relative to the electromagnetic core. The first pole piece magnetically connects opposite sides of the electromagnetic core and includes a pair of tabs disposed generally at opposite ends of the first pole piece. Each tab is generally radially aligned about the central axis and is disposed proximate the generally radially aligned side of one of the legs so that when the first multi-turn coil is energized with the electrical current, two of the tabs that are disposed at opposite ends of the first pole piece are attracted to the magnetic poles developed on that one pair of legs, thus causing the first pole piece to rotate about the central axis in a first direction relative to the electromagnetic core. When the second multi-turn coil is energized, two other tabs of the first pole piece are attracted to the magnetic poles of the other pair of legs, causing the first pole piece to rotate in a second direction about the central axis, opposite the first detection. A torque acting on each of the generally radially aligned tabs as a result of a magnetic force thereby developed is accordingly substantially free of a radial component.

In addition, the torque motor preferably comprises a second pole piece disposed on an opposite side of the electromagnetic core from the first pole piece and mounted to rotate bidirectionally about the central axis relative to the electromagnetic core. The second pole piece also magnetically connects opposite sides of the electromagnetic core and includes a pair of tabs disposed generally at opposite ends of the second pole piece. Each tab is generally radially aligned about the central axis and is disposed proximate one of the generally radially aligned sides of one of the legs. Thus, when the first multi-turn coil is energized with the electrical current, two of the tabs disposed at opposite ends of the second pole piece are attracted to the magnetic poles of the one pair of legs, causing the second pole piece to rotate in the second direction about the central axis relative to electromagnetic core. When the second multi-turn coil is energized, two other tabs of the second pole piece are attracted to the magnetic poles of the other pair of legs, causing the second pole piece to rotate in the first direction about the central axis. A torque acting on each of the generally radially aligned tabs of the second pole piece as a result of the magnetic force thereby developed is substantially free of a radial component. The first pole piece and the second pole piece each comprise a flux linkage path between the magnetic poles for a magnetic flux that is developed when the first and the second multi-turn coils are energized with the electrical current.

In the torque motor, the first and second electromagnetic coils can each be split into two parts. Each part is then disposed on a different one of the legs comprising one of the respective pairs of legs. The first and the second multi-turn coils are preferably alternately energized with the electrical current to cause the first and the second pole pieces to incrementally counterrotate back and forth with respect to each other.

The legs of the electromagnetic core can produce a fringe flux that creates a radial component of force (because of a notch on each side of the legs). To compensate for the radial component of force caused by the fringe flux, both the sides of the legs and the tabs are formed to define a small angle in respect to radii about the central axis, thereby producing a compensating radial force. The compensating force, which is directed opposite to the radial component of force, but is equal in magnitude, thereby insures that the torque acting on the first and second pole pieces is substantially without any radial component.

A further aspect of the invention is directed to a method for producing a bidirectional torque to rotate two members in opposite directions about a central axis without producing a radially directed component of force. The method generally includes steps that are consistent with the functions performed by the components of the torque motor, as explained above.

BRIEF DESCRIPTION OF THE DRAWINGS

FIG. 1 is an exploded view of a prior art compact torque motor;

FIG. 2 is an isometric view of the assembled prior art compact torque motor of FIG. 1;

FIG. 3 is a plan view of the prior art compact torque motor of FIGS. 1 and 2;

FIG. 5A is a schematic plan view of a portion of the core section and two pole piece tabs of the prior art compact motor;

FIG. 5B is a vector diagram illustrating the forces acting on the tabs and pole pieces of the prior art compact motor shown in FIG. 5A;

DESCRIPTION OF THE PREFERRED EMBODIMENTS

Figure 4:
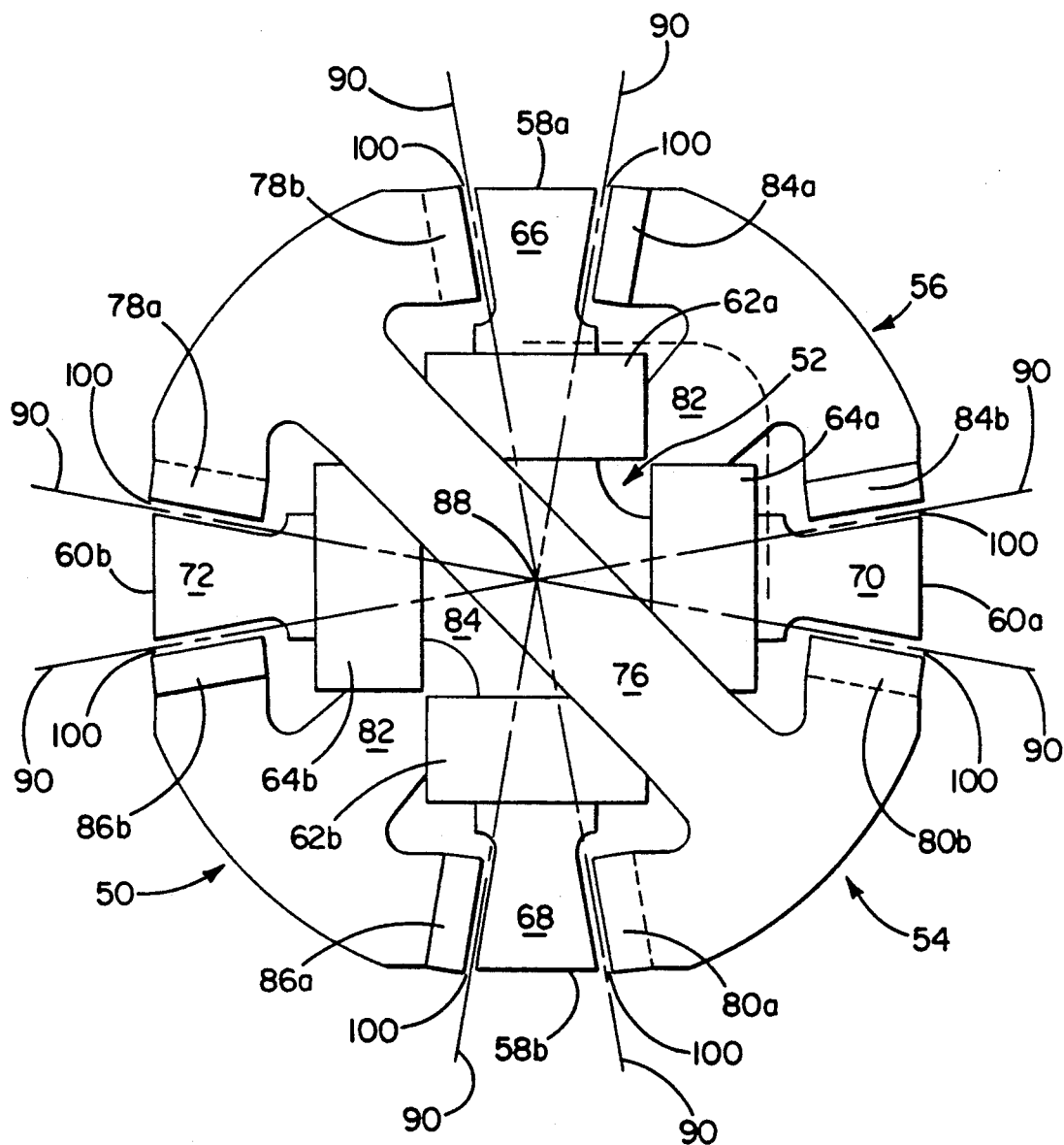
FIG. 4 is a schematic plan view of a compact torque motor with increased torque, in accordance with the present invention.

A prior art compact torque motor 10, which is described in the above-referenced commonly assigned U.S. Pat. No. 4,968,909, is shown in FIGS. 1, 2, and 3. Since the prior art torque motor generally produces a rotational torque in the same manner as the present invention, a detailed explanation of the operation of the prior art torque motor 10 is presented to facilitate an understanding of how the present invention operates and how it is improved to produce an increased rotational torque without radial force components compared to the torque developed by the prior art device.

As apparent in the exploded view of FIG. 1, prior art torque motor 10 includes an X-shaped core 12, a first pole piece 14, and a second pole piece 16. FIGS. 2 and 3 show prior art motor 10 as it appears when assembled, with first pole piece 14 suspended above X-shaped core 12 and second pole piece 16 suspended below the X-shaped core. Both the first and second pole pieces are attached to separate structures (not shown), which are able to counterrotate relative to each other, about a central axis 48 of X-shaped core 12. When used as a drive mechanism for the multi-axis rate sensor discussed above in the Background of the Invention, first pole piece 14 is connected to one generally hemispherically-shaped supporting member, and second pole piece 16 to another generally hemispherically-shaped supporting member. Each of these members are connected to the other and to a base plate by flexures (neither shown) on which X-shaped core 12 is mounted so that the hemispherically-shaped supporting members are driven to counterrotate relative to each other. The first and second pole pieces and the X-shaped core comprise laminated magnetic core material or solid ferromagnetic metal. X-shaped core 12 comprises a first core section 18, including opposed legs 18a and 18b, which are disposed at opposite sides of the X-shaped core, and generally lie along a longitudinal straight line. Similarly, a second core section 20 includes opposed legs 20a and 20b, lying on opposite sides of the X-shaped core. The longitudinal axis of first core section 18 is shown perpendicular to that of second core section 20; however, the longitudinal axes of two core sections may be arranged to form other than a 90° angle without affecting the operation of prior art motor 10.

First core section 18 further includes a first electromagnetic coil 22, which is divided into an electromagnetic coil 22a, disposed around leg 18a, and an electromagnetic coil 22b, disposed around leg 18b. Electromagnetic coils 22a and 22b are wound in series aiding relationship so that when energized with an electrical current, a magnetic pole 26 is formed at the end of leg 18a, and a magnetic pole 28 is formed at the end of leg 18b. Similarly, second core section 20 includes a second electromagnetic coil 24, which is divided into an electromagnetic coil 24a, disposed around leg 20a, and an electromagnetic coil 24b, disposed around leg 20b. Electromagnetic coils 24a and 24b are also wound in series aiding relationship to provide a magnetic pole 30 at the end of leg 20a and a magnetic pole 32 at the end of leg 20b. It will be apparent that magnetic poles 26 and 28 are opposite in polarity to each other, and that magnetic poles 30 and 32 are opposite in polarity to each other. Thus, each leg of X-shaped core 12 includes its own electromagnetic coil and pairs of the coils wound around legs that are aligned with each other are energized with the same current to provide the opposite magnetic poles around a center section 34.

The magnetic flux generated by passing an electrical current through first and second electromagnetic coils 22 and 24 is conveyed respectively through first core section 18 and through second core section 20. However, first and second electromagnetic coils 22 and 24 are not simultaneously energized; instead, these coils are alternately and sequentially energized, causing first and second pole pieces 14 and 16 to counterrotate back and forth, as shown by the arrows in FIG. 3.

First pole piece 14 includes a flux linkage member 36 that extends diametrically across X-shaped core 12 and serves to convey magnetic flux developed when either the first or second electromagnetic coil 22 or 24 is energized with electrical current. At one end of flux linkage member 36 are disposed tabs 38a and 38b; tabs 40a and 40b are disposed at the other end. Each of tabs 38 and 40 are bent downwardly, forming approximately a 90° angle in respect both to the planar surface of flux linkage member 36 and to a plane in which first pole piece 14 rotates back and forth.

Similarly, second pole piece 16 comprises a flux linkage member 42 having tabs 44a and 44b disposed at one end, and tabs 46a and 46b disposed at the other end. Tabs 44 and 46 are bent upwardly at an angle of approximately 90° relative both to the planar surface of flux linkage member 42 and to the plane in which second pole piece 16 rotates back and forth. The tabs on first and second pole pieces 14 and 16 are disposed adjacent opposite surfaces of each magnetic pole 26, 28, 30, and 32. When electrical current flows through first electromagnetic coil 22, both flux linkage members 36 and 42 convey magnetic flux between magnetic poles 26 and 28. Likewise, whenever second electromagnetic coil 24 is energized with an electrical current, the flux linkage members convey magnetic flux between magnetic poles 30 and 32. Energization of first electromagnetic coil 22 causes tabs 38b and 44a to be attracted to opposite surfaces of magnetic pole 26 and tabs 40a and 46a to be attracted to opposite surfaces of magnetic pole 28. The magnetic attraction of magnetic poles 26 and 28 thus causes first pole piece 14 to rotate clockwise and second pole piece 16 to rotate counterclockwise (as viewed in FIG. 3).

When electrical current is applied to second electromagnetic coil 24, tabs 38a and 46b are both attracted to opposite surfaces of magnetic pole 30, while tabs 40b and 44b are attracted to opposite surfaces of magnetic pole 32. As a result, first pole piece 14 rotates counterclockwise, and second pole piece 16 rotates clockwise (as viewed in FIG. 3). It will be apparent that first and second pole pieces 14 and 16 can only rotate through small incremental angles, since relatively small air gaps separate tabs 38, 40, 44, and 46 from the magnetic poles. The small size of the air gaps between the tabs and the magnetic poles ensures that substantial torque is applied to counterrotate any members attached to the first and second pole pieces.

Both pole pieces rotate about central axis 48 (represented by the long/short dash line in FIGS. 1 and 2). Since both first and second pole pieces 14 and 16 are substantially equivalent in mass and counterrotate in opposite directions when the first and second electromagnetic coils are alternately energized, the two torques developed to rotate the first and second pole pieces are opposite in direction, and thus, substantially cancel. Consequently, virtually no torque is transmitted to X-shaped core 12, or to the structure on which it is mounted, and torque motor 10 is thus reactionless with respect to its supporting structure—except for non-torsional stress and vibrational modes that are produced due to radial force components developed by prior art torque motor 10, as explained below.

The same flux linkage members 36 and 42 are used to carry magnetic flux for both first and second electromagnetic coils 22 and 24. Thus, the mass of first and second pole pieces 14 and 16 is substantially less than would be the case if different flux linkage members were required. The first and second pole pieces each provide a return path for magnetic flux between corresponding diametrically opposed magnetic poles. Since the return paths for the magnetic flux crossing X-shaped core 12 are spaced apart from its upper and lower surfaces by a distance equal to at least four times the maximum air gaps separating the tabs on the various pole pieces and the magnetic poles of first and second core sections 18 and 20, flux leakage across the X-shaped core is minimal, reducing the available torque of prior art torque motor 10 by less than five percent. The configuration of the magnetic flux return path provided by the pole pieces is thus relatively efficient, compared to more conventional motors.

Perhaps the most significant advantage of prior art torque motor 10 is its use of extremely lightweight first and second pole pieces. The rotational inertia of first and second pole pieces 14 and 16 is less than one-third that of a wound armature in a typical permanent magnet DC-type motor producing an equivalent torque. In addition, since first and second electromagnetic coils 22 and 24 are stationary, and since electrical power is not provided to windings around any rotating assembly, electrically conductive leads (not shown) that carry electrical current to energize prior art torque motor 10 are not subject to flexing due to the dither motion of the motor, and brushes are not needed.

Referring now to FIG. 4, a compact torque motor having increased torque (with respect to prior art torque motor 10) with virtually no radial component is shown generally at reference numeral 50. As will be apparent from the following description, torque motor 50 is similar in many respects to prior art torque motor 10 and has many of the same advantages and benefits of that device, as noted above. However, torque motor 50 enjoys further advantages and benefits as a result of significant changes made in its configuration compared to the prior art device.

Torque motor 50 includes a generally X-shaped core 52. Core 52 and other elements of torque motor 50 described below preferably comprise the same materials as the corresponding elements of torque motor 10. Disposed on opposite sides of core 52 are a first pole piece 54 and a second pole piece 56. Core 52 includes a first core section 58, which comprises diametrically opposite legs 58a and 58b, and a second core section 60, comprising diametrically opposite legs 60a and 60b.

A first electromagnetic coil 62 disposed on first core section 58 includes an electromagnetic coil 62a, which is connected in series with an electromagnetic coil 62b. Similarly, a second electromagnetic coil 64 disposed on second core section 60 includes electromagnetic coils 64a and 64b, which are also connected in series. When energized with an electrical current, electromagnetic coil 62 produces opposite magnetic poles 66 and 68 at the ends of legs 58a and 58b, respectively. Likewise, when energized with an electrical current, second electromagnetic coil 64 produces opposite magnetic poles 70 and 72 at the ends of legs 60a and 60b, respectively.

A flux linkage member 76 is positioned directly above a center section 74 of core 52, mounted to a structure (not shown) that it is to bidirectionally rotate. Flux linkage member 76 is generally "I-shaped", and at one end, includes downwardly depending tabs 78a and 78b, which are generally radially aligned about a central axis 88 around which flux linkage member 76 is free to rotate through a limited angle. At the opposite end of flux linkage member 76 are disposed downwardly depending tabs 80a and 80b, also generally radially aligned about central axis 88. Below center section 74 of core 52 (in respect to the view of FIG. 4) is disposed a flux linkage member 82, which is oriented generally transverse to flux linkage member 76 and mounted to a second structure (not shown) that it bidirectionally rotates. Flux linkage member 82 is also generally "I-shaped" and at one end includes upwardly extending tabs 84a and 84b, both of which are generally radially aligned about central axis 88. At the opposite end of flux linkage member 82 are disposed upwardly extending tabs 86a and 86b, also generally radially aligned about central axis 88.

As illustrated in FIG. 4, tabs 78 and 80 on flux linkage member 76 and tabs 84 and 86 on flux linkage member 82 are spaced apart from magnetic poles 66, 68, 70, and 72 to define generally radially aligned gaps 100. The general radial alignment of the sides of the magnetic poles and of the tabs is illustrated in respect to a plurality of radially extending lines 90. Thus, it will be apparent that torque motor 50 differs from prior art torque motor 10 in respect to the orientation and configuration of the tabs and the magnetic poles. The shape of magnetic poles 66, 68, 70, and 72, or more specifically, the general radial alignment of the sides of the magnetic poles and the general radial alignment of the tabs are an important aspect of the present invention, as will be evident from the following explanation.

When first electromagnetic coil 62 is energized with an electrical current, tabs 78b and 84a are attracted to the sides of magnetic pole 66, while tabs 80a and 86a are attracted to the sides of magnetic pole 68. As a result, flux linkage member 76 rotates in a clockwise direction and flux linkage member 82 rotates in a counterclockwise direction (in respect to FIG. 4). The magnetic flux produced by the current flowing through first electromagnetic coil 62 is conveyed through each of these tabs that are attracted to magnetic poles 66 and 68 and through the respective flux linkage members 76 and 82. Similarly, when the electrical current through first electromagnetic coil 62 is interrupted and a corresponding electrical current is applied instead to second electromagnetic coil 64, tabs 80b and 84b are attracted to the sides of magnetic pole 70 and tabs 78a and 86b are attracted to the sides of magnetic pole 72, the torque that is thereby developed causing flux linkage member 76 to rotate in a counterclockwise direction and flux linkage member 82 to rotate in a clockwise direction (as shown in FIG. 4). Thus, by alternately energizing the first and second electromagnetic coils with an electrical current, flux linkage members 76 and 82 are caused to rotate back and forth through a limited angle, and any rotatable structures attached to the flux linkage members are driven to counterrotate back and forth in a corresponding fashion, just as explained above in respect to prior art torque motor 10.

FIGS. 5A and 5B illustrate a problem associated with the configuration and orientation of the tabs and magnetic poles used in prior art torque motor 10. In FIG. 5A, only a first portion of core 12 is shown. Although tabs 38b, 44a, 40a, and 46a are shown, the remainder of flux linkage members 36 and 42 are not shown. As will be evident from FIG. 5A, the sides of magnetic poles 26 and 28 are not radially aligned with respect to central axis 48, but instead extend generally parallel with, and equally spaced apart from the longitudinal center of first core section 18. Also, the tabs that are disposed immediately adjacent the sides of first core section 18 extend generally in parallel with the longitudinal center of the first core section and are not at all radially aligned in respect to central axis 48.

A vector diagram 92 shown in FIG. 5B illustrates the consequences of the configuration and orientation of the tabs and magnetic poles in prior art torque motor 10. The force developed by magnetic poles 26 and 28 that attracts the adjacent tabs is directed perpendicular to the non-radially aligned sides of the magnetic poles. However, because the first and second pole pieces rotate around central axis 48, only the component of the force thus developed that is tangential to a radial line produces a rotational torque to rotate the first and second pole pieces about central axis 48. Consequently, as shown in vector diagram 92 of FIG. 5B, the force developed by magnetic poles 26 and 28 are resolved into a tangential force component, $F_T$, and a radial force component, $F_R$. As a result, the radial force component $F_R$ represents a loss or reduction in the total torque applied to rotate the first and second pole pieces 14 and 16 (shown in FIG. 1) about central axis 48. This radial force component is undesirable because it decreases the efficiency of prior art torque motor 10 and because it induces a non-torsional stress and vibration modes into the first and second pole pieces that are transmitted to the structures to which they are attached. When torque motor 10 is applied to bidirectionally counterrotate the accelerometers (not shown) of a multi-axis angular rate sensor, the effects of the non-torsional stress cause noise and errors in the signals produced by the accelerometers.

Figures 6A, 6B:
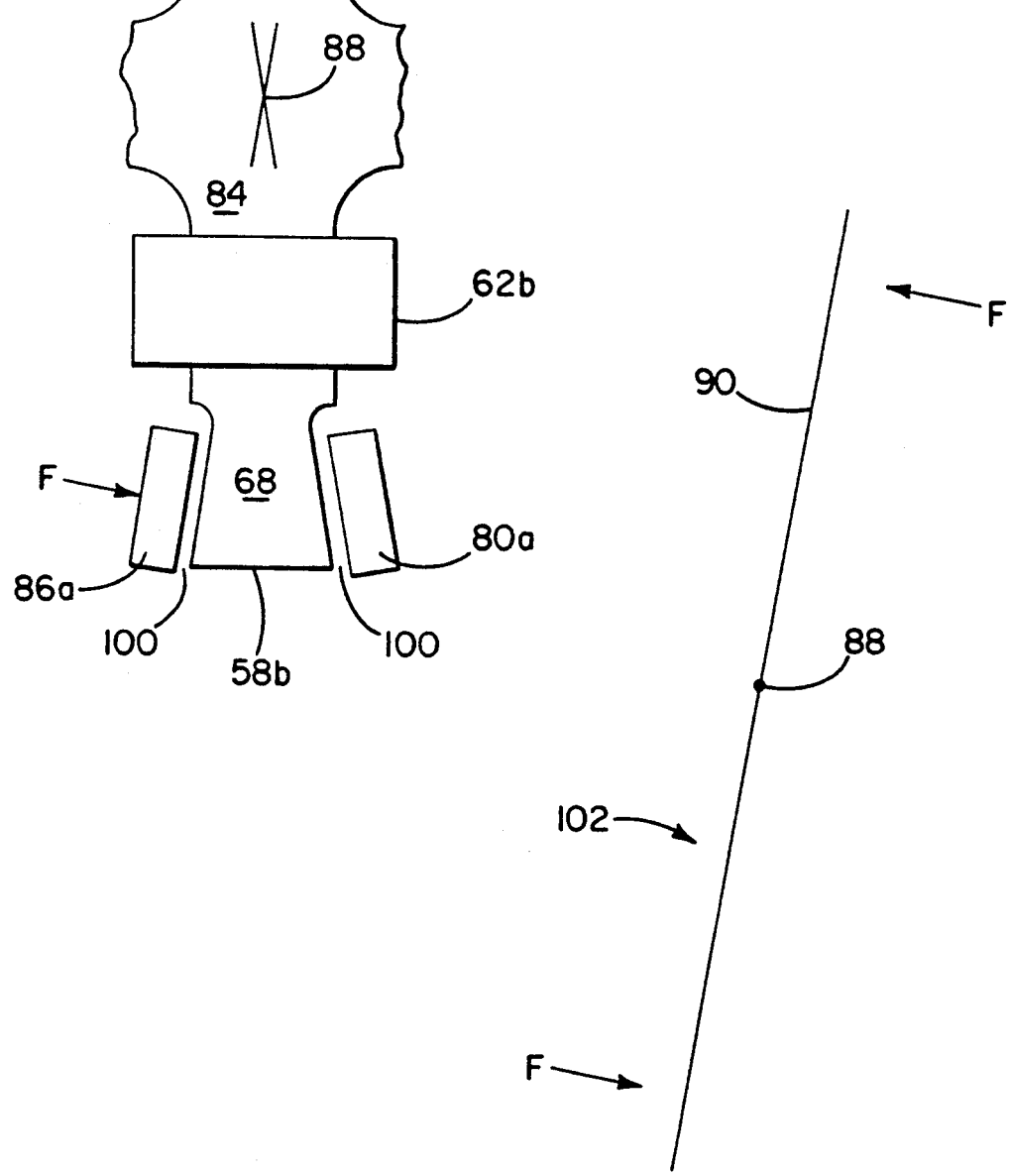
FIG. 6A is a corresponding schematic plan view of a portion of the core section and adjacent pole piece tabs from the first embodiment of the present invention.
FIG. 6B is a vector diagram illustrating the forces acting on the tabs and pole pieces of the present invention.

Torque motor 50 substantially reduces or virtually eliminates the radial force component developed in prior art torque motor 10. To minimize the radial component of force, the sides of the magnetic poles in torque motor 50 are angled so that they are substantially aligned with radial lines 90 that extend through the center of gaps 100 defined between the magnetic poles and the tabs on the first and second pole pieces 52 and 54. For example, as shown in FIG. 6A, tabs 78b and 84a, which are adjacent the two opposite sides of magnetic pole 66, define gaps 100, which are generally aligned with the radial lines extending through central axis 88. Similarly, the adjacent surfaces of tabs 80a and 86a and the sides of magnetic pole 68 define gaps 100 that are also generally aligned with radial lines through central axis 88. Due to the generally radial alignment of the sides of the magnetic poles and tabs in torque motor 50, the forces developed by the magnetic poles that attract the tabs are tangent to the radial lines that extend through central axis 88. This relationship is illustrated in FIG. 6B by a vector diagram 102 in respect to radial line 90. As a consequence of the force developed by each magnetic pole of the torque motor being directed tangentially to radial lines 90, radial components of force are substantially eliminated, and the force thus developed is applied as a rotational torque to rotate the first and second pole pieces, providing increased torque compared to prior art torque motor 10.

Figure 7A:
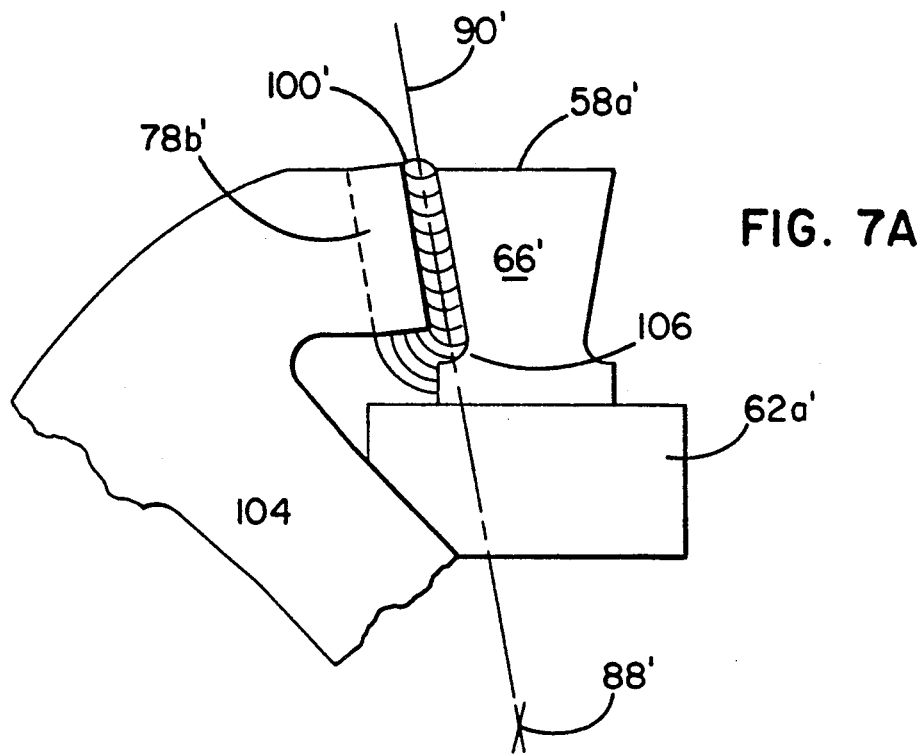
FIG. 7A is a schematic plan view of a portion of a core section and an adjacent pole piece tab, illustrating the fringe field produced by a notch in the side of a leg in a torque motor.
Figure 7B:
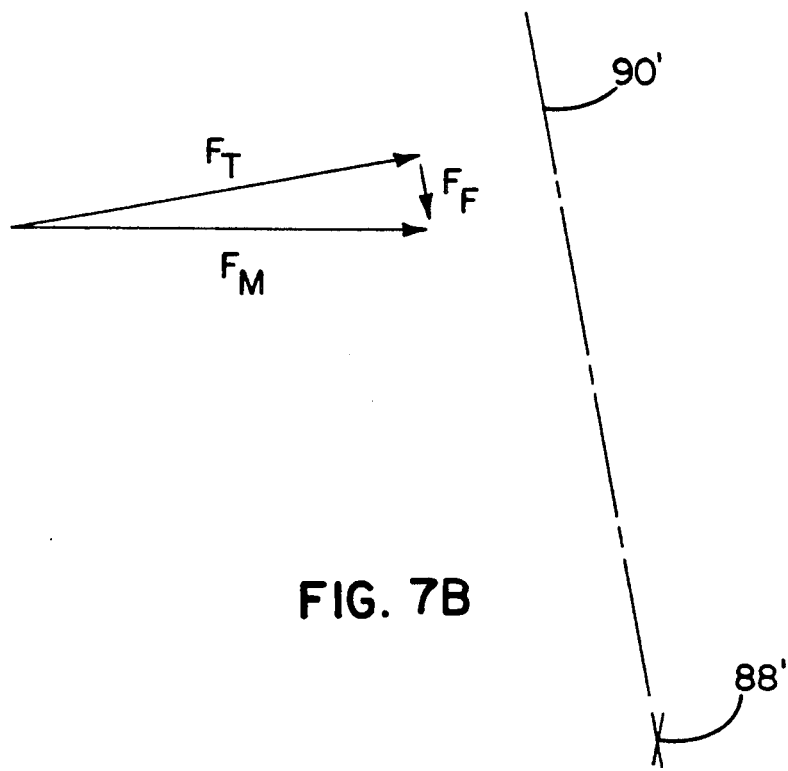
FIG. 7B is a vector diagram illustrating the undesired radial force associated with the fringe field shown in FIG. 7A.

FIGS. 7A and 7B illustrate a further aspect of the present invention relating to a fringe field 104 produced as a result of a notch 106 that is formed in the first and second core sections where the generally radially aligned sides of magnetic poles 66, 68, 70, and 72 change orientation (becoming parallel with the opposite side) to accommodate mounting of first and second electromagnetic coils 62 and 64. Specifically, in FIG. 7A, the left side of a magnetic pole 66' is illustrated to show fringe field 104 produced by notch 106. In the configuration shown in FIG. 7A, the reference numerals include a "prime" notation to indicate that they differ from the preferred form of the elements used in the present invention, torque motor 50. A tab 78b' is disposed adjacent to the left side of magnetic pole 66' to define a gap 100'. In this illustrated configuration, tab 78b' is precisely radially aligned, as is the facing side of magnetic pole 66'. Although most of the force developed by the magnetic flux across gap 100' is tangential to radial line 90', which extends through the center of gap 100', a relatively small radial fringe field force, $F_F$, is produced as a result of the fringe field 104 adjacent the end of notch 106 (See FIG. 7B). Consequently, the vector sum of the tangential force $F_T$ and the fringe field force $F_F$ is a force, $F_M$, which is not tangent to radial line 90'. In FIG. 7B, a vector diagram 108 illustrates this relationship, although exaggerating the contribution of the fringe field force.

Figure 8A:
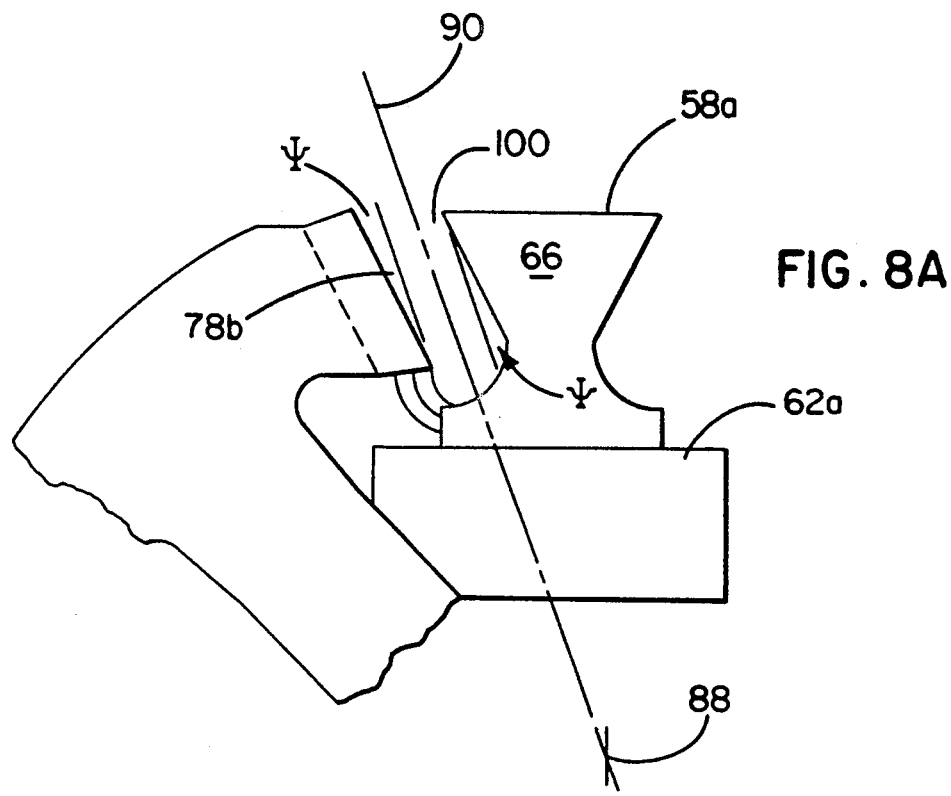
FIG. 8A is a schematic plan view of a portion of a magnetic pole and an adjacent pole piece tab from the present invention, which is compensated for the effects of the fringe field.
Figure 8B:
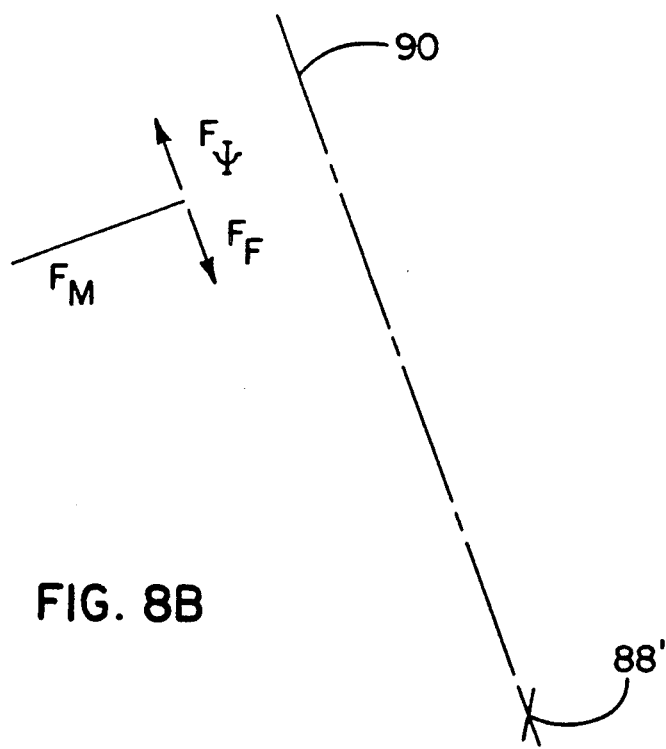
FIG. 8B is a vector diagram showing how a compensating force developed by the present invention compensates for the fringe field.

The radial force component produced by the fringe field is relatively small in magnitude, and in certain applications of the torque motor, can be ignored. However, in applications where the small radial force component due to the fringe field is unacceptable, torque motor 50 compensates for the radially directed fringe force that results from the fringe field using the technique shown in FIG. 8A. Although again exaggerated for purposes of illustration, both tab 78b and the facing side of magnetic pole 66 are formed so that they define a very small angle $\psi$ in respect to radial line 90. By thus "overrotating" both the sides of the magnetic poles and each of the tabs on the first and second pole pieces in torque motor 50, a force, $F_\psi$, is provided that is equal in magnitude to the fringe field force $F_F$ developed by the fringe field, but opposite in direction. This force $F_\psi$ entirely compensates for the fringe field force. A vector diagram 110 in FIG. 8B illustrates how the force $F_\psi$ cancels or compensates for the radially directed fringe field force $F_F$ resulting from the fringe field so that the torque acting on the first and second pole pieces is entirely tangential to radial line 90.

Figure 9:
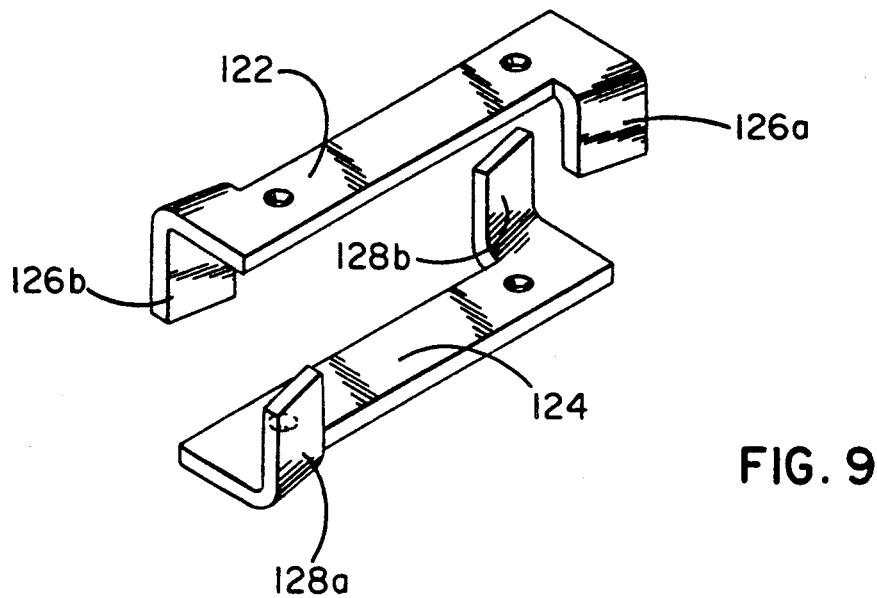
FIG. 9 is an isometric view of two alternative pole pieces for use in the present invention.

In FIG. 9, an alternative pole piece configuration for torque motor 50 is illustrated wherein a flux linkage member 122 includes a tab 126a on one end, and along the opposite edge and at the opposite end, includes a second tab 126b. Flux linkage member 122 can be cut and formed from flat sheet stock of electromagnetic core material (not shown), as can a flux linkage member 124 having a tab 128a disposed along one side and at one end, and on the opposite edge and opposite end, a tab 128b. Tabs 126 and 128 are formed at an angle, so that when used in torque motor 50, in cooperation with an adjacent generally radially aligned side of the magnetic poles, the tabs each define a gap that is also generally radially aligned. Tabs 126 and 128 are preferably offset from precise radial alignment by a very small angle, $\psi$, if required to compensate for fringe field effects.

Figure 10:
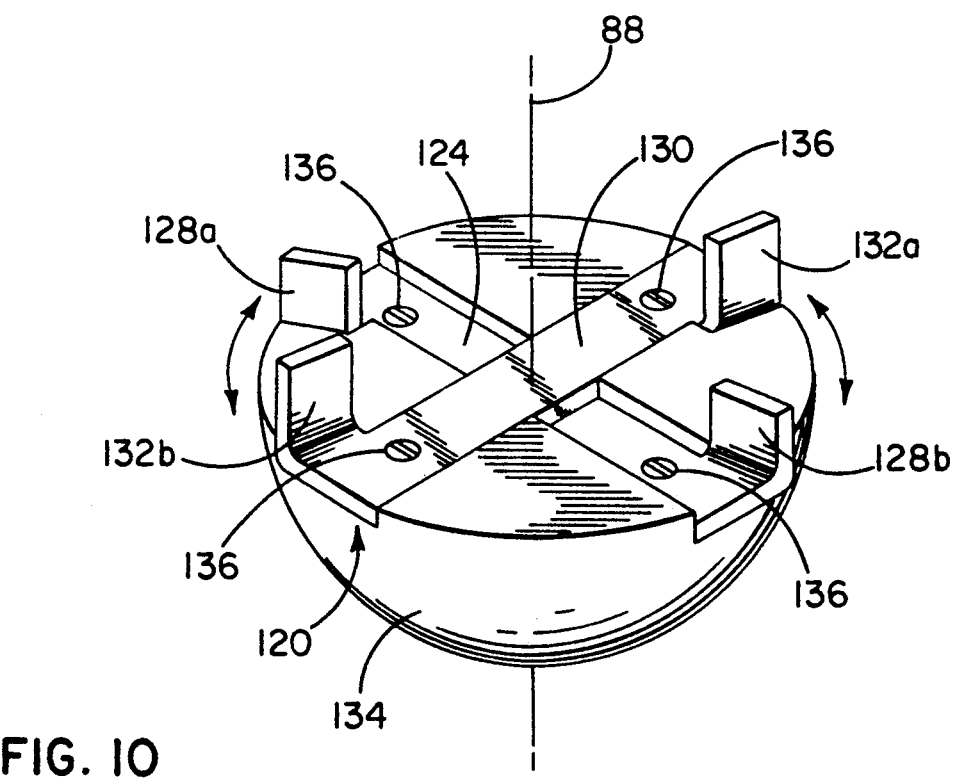
FIG. 10 is an isometric view of the alternative pole piece referenced in FIG. 9, following assembly and attachment to a hemispherical member that is rotated by the compact torque motor of the present invention.

FIG. 10 illustrates how flux linkage member 124 and a flux linkage member 130, which is configured as a mirror image of flux linkage member 124, are mounted to a hemisphere 134 to form a pole piece 120. Hemisphere 134 is thus driven to bidirectionally rotate, as illustrated by the arrows. Each of the flux linkage members are secured in place to the hemisphere using machine screws 136 so that as the flux linkage members rotate back and forth, the hemisphere also rotates. Flux linkage member 130 includes generally radially aligned tabs 132a and 132b, which are attracted to the sides of the magnetic poles of torque motor 50 to rotate the hemisphere in one direction when one of the electromagnetic coils 62 and 64 are energized; thereafter, tabs 128a and 128b are attracted to the magnetic poles to rotate the hemisphere in the opposite direction, when the other of electromagnetic coils 62 and 64 are energized. Although not shown in FIG. 10, a second hemisphere rotatably mounted above the X-shaped core of torque motor 50 is thus driven to counterrotate about central axis 88 in respect to hemisphere 134 when the first and second electromagnetic coils are alternately sequentially energized, as explained above.

While the present invention has been described with respect to several preferred embodiments, those of ordinary skill in the art will recognize that further modifications may be made thereto within the scope of the claims that follow. Accordingly, it is not intended that the invention be in any way limited by the disclosure, but instead that its scope be determined entirely by reference to the claims.

The embodiments of the invention in which an exclusive property or privilege is claimed are defined as follows:

1. A torque motor having a central axis about which a rotational torque is developed, comprising:
   (a) an electromagnetic core including two pairs of outwardly extending legs arranged around the central axis, a radially outer end of one leg of each pair of legs being disposed diametrically opposite a radially outer end of the other leg of the pair, each leg having opposite sides that, adjacent its outer end, are generally radially aligned about the central axis of the torque motor;
   (b) a first multi-turn coil disposed around one pair of legs, said first multi-turn coil being operative, when energized with an electrical current, to cause the radially outer ends of said one pair of legs to become opposite magnetic poles;
   (c) a second multi-turn coil disposed around the other pair of legs, said second multi-turn coil being operative, when energized with an electrical current, to cause the radially outer ends of said other pair of legs to become opposite magnetic poles; and
   (d) a first pole piece mounted to rotate bidirectionally about the central axis relative to the electromagnetic core, said first pole piece magnetically connecting opposite sides of the electromagnetic core and including a pair of tabs disposed generally at opposite ends of the first pole piece, each tab being generally radially aligned about the central axis and disposed proximate the generally radially aligned side of one of the legs so that when the first multi-turn coil is energized with the electrical current, two of the tabs disposed at opposite ends of the first pole piece attracted to the magnetic poles of said one pair of legs, causing the first pole piece to rotate about the central axis in a first direction relative to the electromagnetic core, and when the second multi-turn coil is energized, two other tabs of the first pole piece are attracted to the magnetic poles of said other pair of legs, causing the first pole piece to rotate in a second direction about the central axis, opposite the first direction, a torque acting on each of the generally radially aligned tabs as a result of a magnetic force that is thereby developed being substantially free of a radial component because of the generally radial alignment of the sides of the legs and of the tabs.

2. The torque motor of claim 1, wherein the first electromagnetic coil is split into two parts, each part being disposed on a different one of the legs of said one pair of legs, and wherein the second electromagnetic coil is split into two parts, each part being disposed on a different one of the legs of said other pair of legs.

3. The torque motor of claim 1, wherein the first pole piece has opposed ends that are diametrically connected through the central rotation axis.

4. The torque motor of claim 1, further comprising a second pole piece disposed on an opposite side of the electromagnetic core from the first pole piece and mounted to rotate bidirectionally about the central axis relative to the electromagnetic core, said second pole piece magnetically connecting opposite sides of the electromagnetic core and including a pair of tabs disposed generally at opposite ends of the second pole piece, each tab being generally radially aligned about the central axis and disposed proximate the generally radially aligned side of one of the legs, so that when the first multi-turn coil is energized with the electrical current, two of the tabs disposed at opposite ends of the second pole piece are attracted to the magnetic poles of said one pair of legs, causing the second pole piece to rotate in the second direction about the central axis relative to the electromagnetic core, and when the second multi-turn coil is energized, two other tabs of the second pole piece are attracted to the magnetic poles of said other pair of legs, causing the second pole piece to rotate in the first direction about the central axis, a torque acting on each of the generally radially aligned tabs of the second pole piece as a result of a magnetic force that is thereby developed being substantially free of a radial component because of the generally radial alignment of the sides of the legs and of the tabs on the first and second pole pieces.

5. The torque motor of claim 4, wherein the first pole piece and the second pole piece each comprise a flux linkage path between the magnetic poles for a magnetic flux that is developed when the first and the second multi-turn coils are energized with the electrical current.

6. The torque motor of claim 4, wherein the first and the second multi-turn coils are alternately energized with the electrical current to cause the first and the second pole pieces to incrementally counterrotate back and forth with respect to each other.

7. The torque motor of claim 4, wherein the second pole piece has opposed ends that are diametrically connected through the central rotation axis.

8. The torque motor of claim 4, wherein the legs of the electromagnetic core produce a fringe flux that creates a radial component of force, and wherein to compensate for the radial component of force caused by the fringe flux, both the sides of the legs and the tabs each form a predefined small angle in respect to radii about the central axis, thereby producing a compensating radial force that is equal in magnitude but opposite in direction to the fringe force developed due to the fringe flux, so that the torque acting on the first and second pole pieces is substantially without any radial component.

9. A compact motor for providing opposed rotational driving torques, said motor comprising:

(a) a generally X-shaped electromagnetic core including a first core section and a second core section, each core section comprising two diametrically opposed legs disposed about a common central axis, each leg having opposite sides, each side including a portion comprising a pole face that is generally radially aligned about the central axis;

(b) first magnetic coil means, disposed on the first core section, for developing a magnetic flux within the first core section when energized with an electrical current, so that opposite magnetic poles are produced at radially outer ends of the legs comprising the first core section, said magnetic flux flowing through the pole faces on the first core section;

(c) second magnetic coil means, disposed on the second core section, for developing a magnetic flux within the second core section when energized with an electrical current, so that opposite magnetic poles are produced at radially outer ends of the legs comprising the second core section, said magnetic flux flowing through the pole faces on the second core section;

(d) first pole piece means, disposed on one side of the electromagnetic core, for magnetically linking the opposite magnetic poles of the first and the second core sections, said first pole piece means including first tab means, disposed proximate the generally radially aligned pole faces on the legs of the first and second core sections, for defining a plurality of surfaces that are attracted to the magnetic poles, causing rotation of the first pole piece means about the central axis; and (e) second pole piece means, disposed on an opposite side of the electromagnetic core from the first pole piece means, for magnetically linking the opposite magnetic poles of the first and the second core sections, said second pole piece means including second tab means, disposed proximate the generally radially aligned pole faces on the legs of the first and second core sections, for defining a plurality of surfaces that are attracted to the magnetic poles, causing the second pole piece means to rotate about the central axis in a direction opposite that in which the first pole piece means rotate, the generally radially aligned pole faces on the legs and the generally radially aligned first and second tab means producing a torque that is substantially free of a radial component.

10. The compact motor of claim 9, wherein the electromagnetic core produces a fringe flux at one end of each pole face that causes a radial force component, and wherein the pole faces and the tab means each form a predefined small angle in respect to radii about the central axis, where the predefined small angle is selected to produce a compensating force acting on the first and second pole piece means, the compensating force being equal in magnitude but opposite in direction to the force component caused by the fringe flux to compensate for the radial force component caused by the fringe flux, so that the torque applied to rotate the first and second pole piece means is substantially free of a radial component.

11. The compact motor of claim 9, wherein the first and second pole piece means each comprise a magnetic flux conductive member extending across the electromagnetic core, generally through and transverse to the central axis.

12. The compact motor of claim 11, wherein the first and the second tab means are integral with said members.

13. The compact motor of claim 9, wherein the first and second magnetic coils are alternately energized with the electrical current to cause the first and the second pole piece means to incrementally counterrotate back and forth.

14. The compact motor of claim 9, wherein the electromagnetic core is fixedly mounted to a supporting structure, wherein the first and the second pole piece means are mounted so as to rotate with respect to the supporting structure, and wherein attraction of the first and second tab means to the magnetic poles develops torques that are applied to the first and second pole piece means and are substantially equal and opposite, so that the motor is substantially reactionless with respect to transmitting any torque to the supporting structure.

15. The compact motor of claim 9, wherein the first and the second magnetic coil means each include coils of an electrical conductor disposed about the diametrically opposite legs of the respective first and second core sections.

16. A method for producing a bidirectional torque to rotate two members in opposite directions about a central axis without producing a radially directed torque, said method comprising the steps of:

(a) selectively producing a magnetic flux in a first core section that extends transversely through the central axis and has radially outer ends extending from the central axis, so that the radially outer ends of the first core section comprise opposite magnetic poles having pole face surfaces that are generally radially aligned;

(b) selectively producing a magnetic flux in a second core section that extends transversely through the central axis and the first core section, and has radially outer ends extending from the central axis, so that the radially outer ends of the second core section comprise opposite magnetic poles having pole face surfaces that are generally radially aligned; and (c) magnetically linking the opposite magnetic poles of the first and second core sections through one of the members, said one of the members having generally radially aligned surfaces that are disposed proximate to the generally radially aligned pole face surfaces of one of the first and second core sections, so that opposite ends of said one member are attracted to the magnetic poles of the first core section when the magnetic flux is selectively produced in it, and are attracted to the magnetic poles of the second core section when the magnetic flux is selectively produced in it, said one member rotating back and forth between the first and the second core sections in response to the magnetic flux produced therein, said magnetic flux producing a torque that is substantially tangential to a radius through the central axis because of the generally radially aligned pole surfaces and generally radially aligned surfaces of the members.

17. The method of claim 16, wherein the step of selectively producing magnetic flux in the first core section comprises the step of supplying an electrical current to a magnetic coil that is disposed on the first core section, to induce the magnetic flux within the first core section, and wherein the step of selectively producing magnetic flux in the second core section comprises the step of supplying an electrical current to a magnetic coil that is disposed on the second core section, to induce the magnetic flux within the second core section.

18. The method of claim 16, further comprising the steps of alternately supplying the electrical current to one of the magnetic coils on the first and second core sections, and then to the other magnetic coil on the first and second core sections.

19. The method of claim 16, further comprising the step of magnetically linking the opposite magnetic poles of the first core section and the second core sections through the other of the members, so that opposite ends of said other member are attracted to the magnetic poles of the first core section when the magnetic flux is selectively produced in it, and are attracted to the magnetic poles of the second core section when the magnetic flux is selectively produced in it, said other member rotating back and forth between the first and the second core sections in a direction opposite to that of said one member, in response to the magnetic flux produced within the first and second core sections.

20. The method of claim 19, wherein the torque applied to the first member as a result of the magnetic flux produced within the first and second core sections is substantially equal and opposite to the torque applied to the second member as a result of the magnetic flux produced within the first and second core sections, so that the substantially no torque is transmitted to a supporting structure as the first and second members counterrotate back and forth.

21. The method of claim 16, wherein the first and second core sections produce a fringe flux that causes a radially directed component of force, further comprising the step of compensating for the radially directed force caused by the fringe flux by angling the surfaces of the members and the pole face surfaces that are magnetically attracted to each other at a small predefined angle relative to radii about the central axis to produce a compensating force that is equal in magnitude but opposite in direction to the radially directed force caused by the fringe flux, so that the rotational torque acting on the two members does not include any significant radial component.

* * * * *